United States Patent [19]

Schneider et al.

[11] 4,065,390
[45] Dec. 27, 1977

[54] PLATE TYPE FILTER APPARATUS

[75] Inventors: John R. Schneider, Belvedere; Kenneth B. Klyver, Santa Rosa, both of Calif.

[73] Assignee: J.R. Schneider Co., Inc., Tiburon, Calif.

[21] Appl. No.: 766,186

[22] Filed: Feb. 7, 1977

[51] Int. Cl.² ............................................. B01D 25/12
[52] U.S. Cl. ..................................... 210/225; 210/231
[58] Field of Search ............... 210/225, 227, 228, 230, 210/231, 340, 387

[56] References Cited

U.S. PATENT DOCUMENTS

| 3,499,532 | 3/1970 | Schneider | 210/225 X |
| 3,608,734 | 9/1971 | Schneider | 210/387 |

Primary Examiner—John Adee
Attorney, Agent, or Firm—Owen, Wickersham & Erickson

[57] ABSTRACT

Disclosed is an improved filter of the type comprised of a series of stacked plate assemblies forming filter chambers adjacent to sheets of filter media between plate assemblies. The plate assemblies are constructed so that liquid can be rapidly removed from the filter chambers to prevent spillage when it becomes necessary to separate the plate assemblies and replace the filter media. Each plate assembly has an internal baffle system along one side having inlets for liquid to be filtered. The baffle system for each plate assembly deflects liquid coming into the chamber so as to prevent it from disturbing the filter cake, and it also allows substantially all of the liquid to be blown out of the chamber during a reverse flow "blow-down" procedure prior to separation of the plate assemblies.

9 Claims, 17 Drawing Figures

FIG_1 (PRIOR ART)

FIG_2 (PRIOR ART)

FIG_3

FIG_4

FIG_5

FIG_6

FIG_7

FIG_8

FIG_9

FIG_10

FIG_11

FIG_12

FIG_13

FIG_14

FIG_15

FIG_16
(PRIOR ART)

FIG_17

PLATE TYPE FILTER APPARATUS

BACKGROUND OF THE INVENTION

This invention relates to liquid filtering apparatus, and particularly to filters of the so-called horizontal plate type.

Such filters, as described in U.S. Pat. No. 3,608,734 are commonly used for various industrial applications to cleanse large volumes of liquids such as coolants for metal rolling mills, metal can manufacturing lines and other metal working apparatus. Generally, they comprise a plurality of plate-like members which, when stacked together, form one or more filter chambers, each with an inlet for the liquid to be filtered. A layer of filter media is disposed between each adjacent pair of plates and space is provided under the media layer to trap the filtered liquid which then flows through outlet passages to a central storage container. The plate members are separable simultaneously to facilitate removal and replacement of the filter media after it has become clogged with deleterious filtered out material. Prior to separation of the plate members, the filter must be "blown-down". That is, all of the liquid within the filter chambers between the plate members must be removed so that no spillage occurs when the previously sealed plates are moved apart. In horizontal plate filters developed prior to the present invention, this "blow-down" procedure was relatively time consuming because such previous systems required essentially all of the liquid to be forced through the dirty filter media. This created serious problems, particularly where the filter apparatus comprised an essential link in an operating chain of equipment of a manufacturing facility such as a metal rolling mill. In such situations the time required to "blow-down" the filter and change its filter media was also costly "down" time for the manufacturing machinery itself. Additionally a rapid blowdown at elevated pressures will force dirt and tramp oil through the filer media into the clean coolant reservoir.

BRIEF SUMMARY OF THE INVENTION

As a solution to the problem of speeding up the "blow-down" procedure, the present invention provides means for moving the excess liquid trapped between adjacent filter plate assemblies back through the inlet conduits instead of slowly forcing it through the filter media. In general, this is accomplished in accordance with the present invention by provision of a unique baffle system in each plate assembly. During normal filter operation, the main force of the entering liquid is deflected and dissipated so that the filter cake is relatively undisturbed. Yet, when it becomes necessary to remove the liquid from the chambers between adjacent plate assemblies, the baffle system allows the blow-down air stream to be directed as a sheet across the filter media to remove practically all of the liquid between adjacent plates. At the commencement of the blow-down cycle, compressed air is applied at openings previously used as vents and as it flows into the plate chambers, the liquid therein is forced through special openings in the baffle system and through the liquid inlets for return to the sump of unfiltered liquid.

Briefly, the objects of the present invention are: (1) to provide a filtered apparatus of the plate type that will operate with a relatively short "blow-down" cycle; (2) to provide a filter apparatus with a control system for controlling blow-down that will operate efficiently either by manual control or automatically; (3) to provide a filter apparatus comprising a plurality of horizontal plate assemblies, each having a baffle system that deflects incoming liquid to be filtered so as to avoid undue disturbance of the filter cake and yet which allows a reverse flow of liquid during "blow-down" that enables compressed air to remove practically all liquid from the filter chambers in a relatively short period of time; (4) to provide an improved filter plate assembly for a horizontal plate filter that will facilitate a more efficient flow of filtered liquid; and (5) to provide a filter plate assembly for a horizontal plate filter that is particularly adapted for ease and economy of manufacture.

Other objects, advantages and features of the invention will become apparent from the following detailed description taken with the accompanying drawings.

DETAILED DESCRIPTION OF EMBODIMENT

Figure 1:
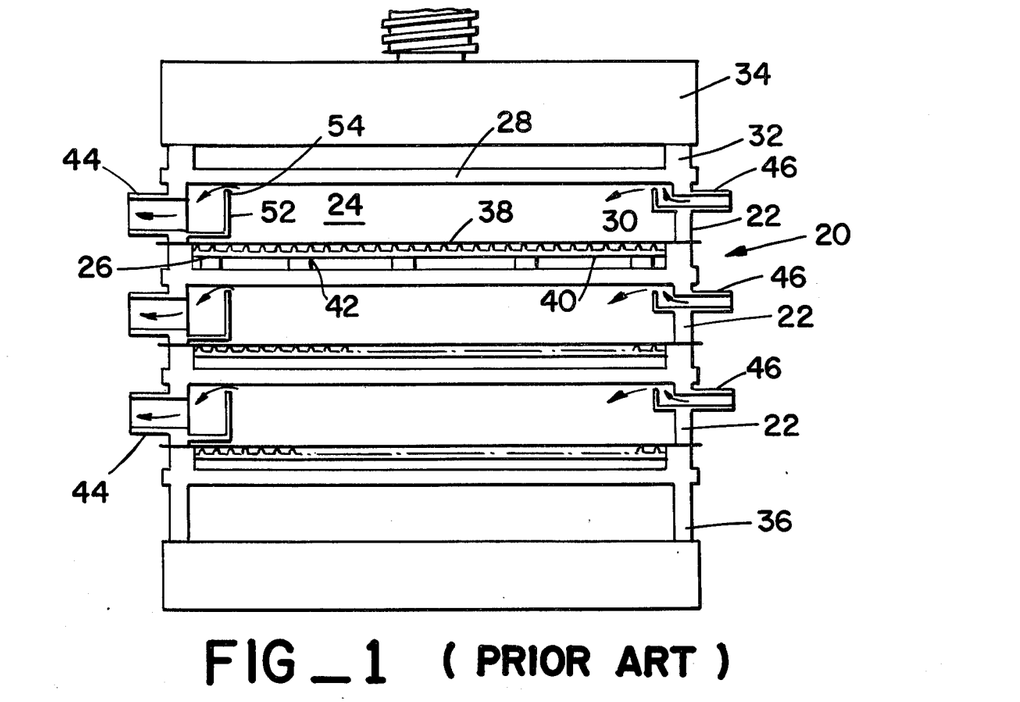
FIG. 1 is a schematic view in elevation and in section showing stacked plates for a horizontal plate filter of the prior art with arrows indicating the flow of air during the blow-down cycle.
Figure 2:
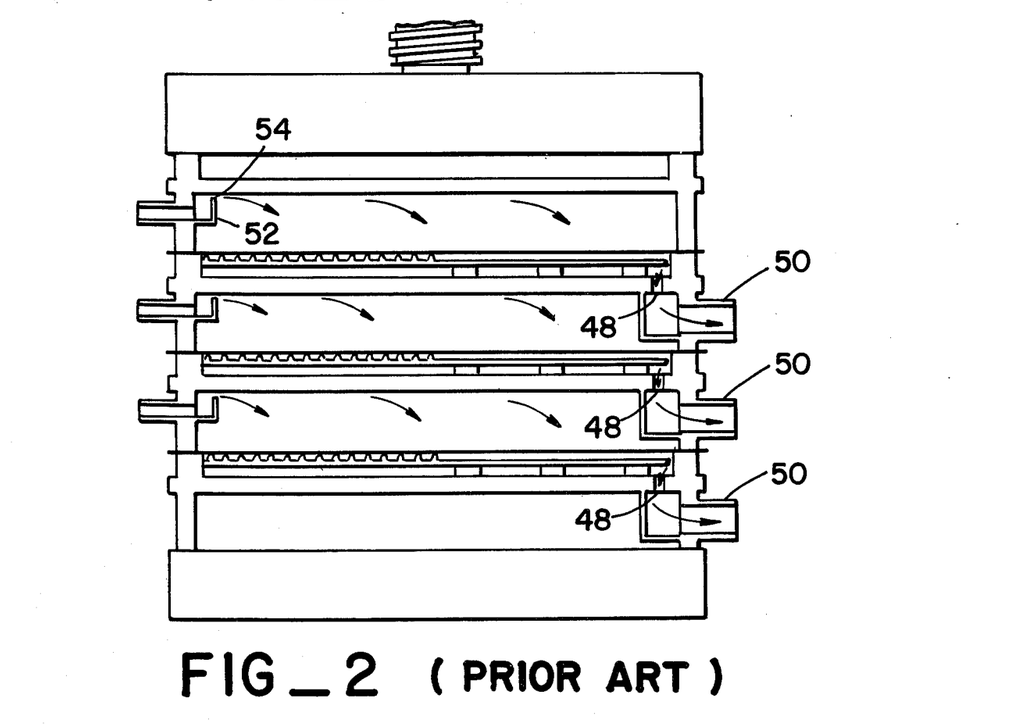
FIG. 2 is a similar schematic view in elevation showing the flow of fluid through the prior art filter of FIG. 1.

With reference to the drawing, FIG. 1 shows a somewhat schematic cross sectional view of horizontal plate filter 20 of the prior art type described in greater detail in my previous U.S. Pat. No. 3,608,734. As illustrated, this filter comprises a series of two or more plate assemblies 22 that are stacked together to form upper and lower chambers 24 and 26. Each plate has a transverse planar portion 28 with a peripheral, downwardly extending lower side wall 30 and a shorter, upwardly extending peripheral upper side wall 32. All of these plate assemblies are located between upper and lower plates 34 and 36 and are connected together by a suitable linkage structure and a press and separating mechanism (not shown). During normal operation of the filter, the stacked plates are pressed together with a sheet of filter media 38 positioned between adjacent plate assemblies. The downwardly extending and upwardly extending sidewalls of adjacent stacked plates form upper and lower chambers above and below the filter media, and when the filter media becomes loaded or clogged with filtered out material, the separating mechanism must lift the plates upwardly to separate them and allow removal and replacement of the filter media. In the upper chamber of each plate the filter media is supported by a serrated plate 40 that is held above the transverse planar portion of the plate by a support grate 42 providing a space around the serrated plate in the lower chamber. As shown in FIG. 1, an inlet 44 is provided in the downwardly extending wall 30 of each plate to permit the entrance of liquid to be filtered into the upper chamber of the plate, and a vent port 46 is provided in the opposite sidewall of each plate for removing unwanted air. As shown in FIG. 2, each planar portion has a series of drain ports 48 for filtered liquid that feed into an outlet 50, and these outlets from all plates are connected to a common conduit (not shown).

Before the plates of any horizontal plate filter can be separated by the lifting mechanism for removal and replacement of the filter media, the liquid within the upper chamber 24 formed by each plate 22 must be evacuated to prevent spillage. Usually, the filter media is so clogged at this point that it is impractical or impossible to force the liquid through it before separating the plates. Consequently, to speed up the liquid evacuation process prior to plate separation it has been the practice to blow-down the filter prior to plate separation by forcing air back through the vent ports 46 of the plates 22, thereby blowing liquid back through its inlets to its storage container. This blow-down reverse flow is indicated by the arrows in FIG. 1.

As shown in FIG. 1, it is essential that each plate be provided with a baffle 52 along the sidewall 30 having the inlet 44 for liquid to be filtered in order to prevent the incoming liquid from disturbing the filter cake. Heretofore, this baffle provided a gap 54 along its upper edge through which the incoming liquid can flow after its velocity energy has been dissipated by striking the baffle. However, heretofore during the blowdown procedure, the baffle 52 prevented the full removal of all or even a substantial amount of the unfiltered liquid from the upper chamber prior to separation of the plates because this liquid could not be forced through the upper gap 54. Thus, in prior art filters, as shown in FIGS. 1 and 2, the blow-down procedure was time-consuming and inefficient and decreased the effectiveness of such filters.

Figure 3:
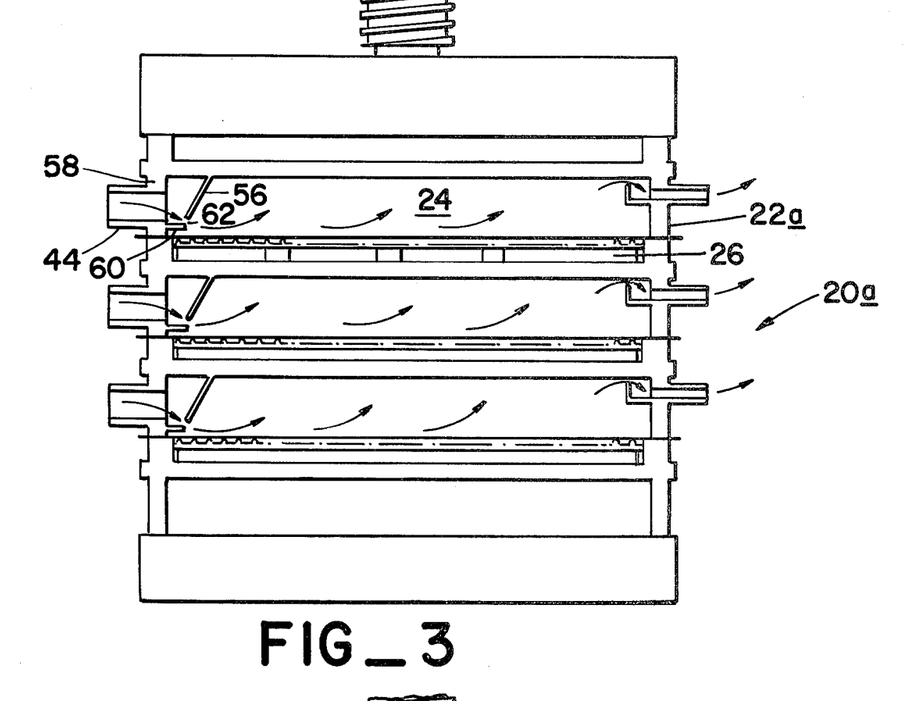
FIG. 3 is a schematic view in elevation and in section showing the stacked plates of a horizontal plate filter according to the present invention with arrows indicating the flow of air and gases through open vent valves during a normal filtration cycle.
Figure 4:
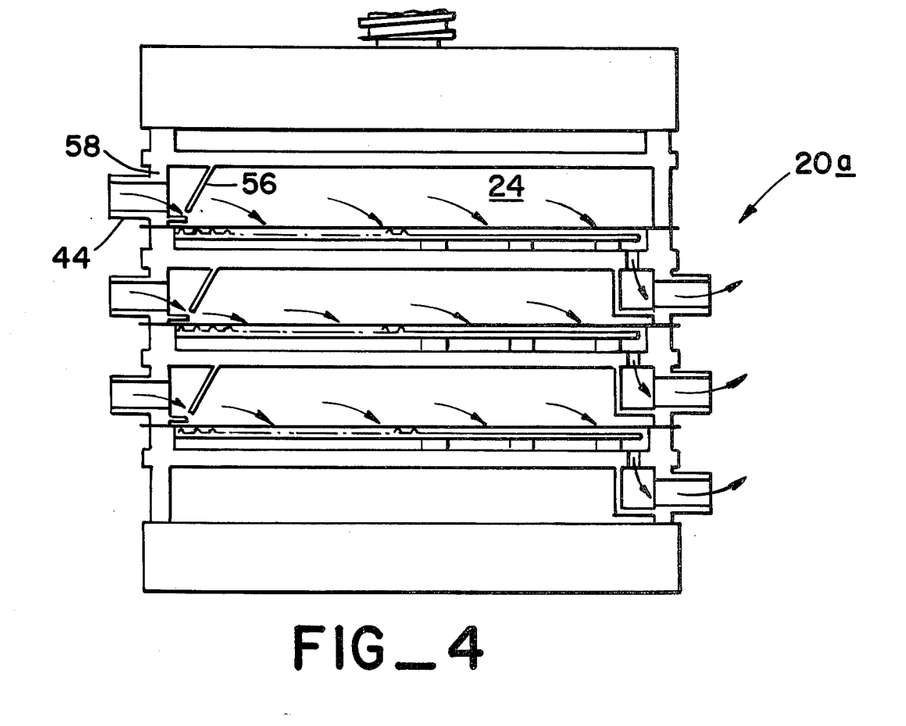
FIG. 4 is another elevation view of the filter of FIG. 3, with arrows indicating the normal flow of liquid during a filtration cycle.
Figure 5:
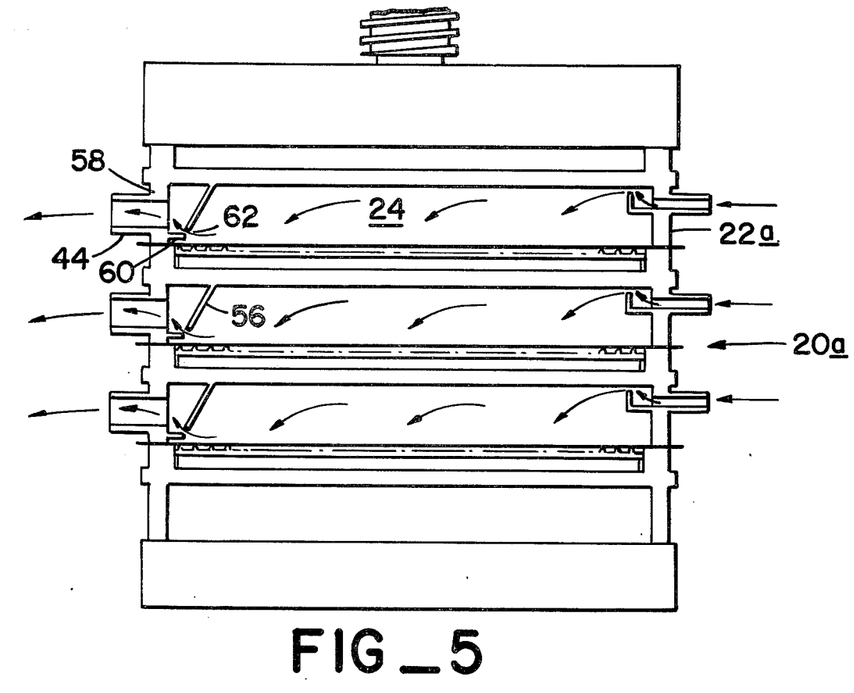
FIG. 5 is another view of the filter of FIG. 3, with arrows indicating the reverse flow of air during a blow-down cycle.

Turning now to FIGS. 3 to 5, a filter 20a embodying features of the present invention is shown which make possible a relatively quick blow-down procedure and thus greater filter operating efficiency. Here, each of the upper, intermediate and lower plates have generally the same exterior configuration as those for the prior art filter 20. However, internally, the intermediate or working plates 22 comprising the filter 20a are provided with a unique baffle system. In this system, an inclined baffle strip 56 is provided on each plate which is parallel to a lower downwardly extending sidewall portion 58 having a liquid inlet port 44. This inclined baffle strip is combined with a narrower, horizontal strip 60 that is parallel to and spaced upwardly from the planar plate portion 28. The inclined strip and the horizontal strip are spaced apart to form a gap 62 that is located just about the surface of the filter media within the upper chamber 24. Thus, as liquid flows into the upper chamber of each plate during normal operation of the filter, the inclined baffle strip 56 prevents any significant disturbance of the media 38 from occurring by removing energy from the liquid stream and deflecting its force from the media. However, when blow-down of the filter 20a takes place, as indicated in FIG. 4, the air forced into the upper chambers of the filter through the vent ports will push almost all of the liquid from the chamber 24, because it can readily flow through the lower gap 62 between the baffle strips 56 and 60 and out the inlet 44. Because of this, the blow-down procedure for the filter 20a can be done relatively quickly and it is not necessary to force liquid through the filter media in order to evacuate the filter chambers.

Figure 8:
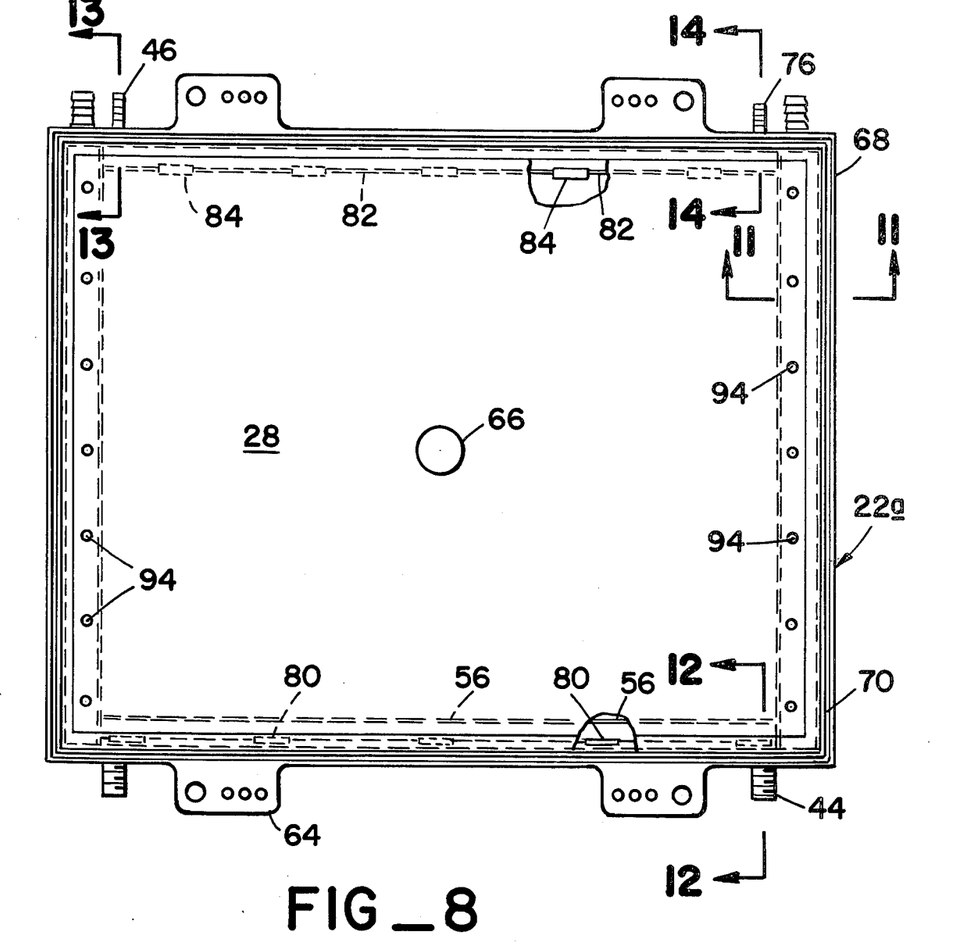
FIG. 8 is a plan view of an intermediate plate for a filter as in FIG. 3 according to the principles of the invention.
Figure 9:
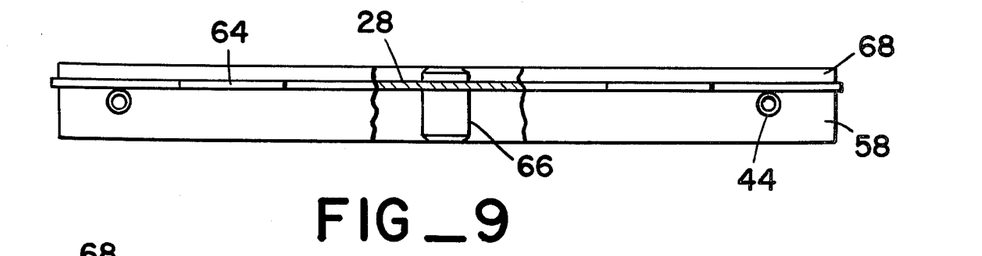
FIG. 9 is a side view in elevation and partly in section of the filter plate of FIG. 8.
Figure 10:
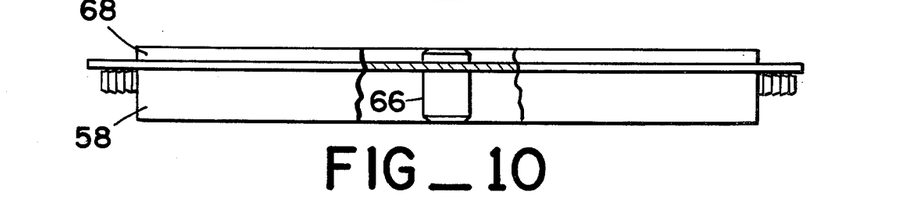
FIG. 10 is an end view in elevation and partly in section of the filter plate of FIG. 8.

In FIGS. 8 to 15 more detailed views of a typical intermediate plate assembly 22a for the filter 20a are shown. As illustrated in FIG. 8 this plate has generally a rectangular configuration and may be fabricated from any suitable material such as steel. To minimize weight and assembly expense the various components of the plate assembly are preferably precut and machined where necessary and then welded together. The main transverse planar member 28, is preferably made from a piece of rolled steel plate; cut to a predetermined size and shape; and provided with pairs of spaced apart ears or tab portions 64 on two opposite sides which are utilized to guide and support the plates and to control their spacing during separation. Also, in the middle of the planar member we may provide a cylindrical bar 66 which extends vertically and serves as column support between the upper to the lower plates to thereby permit a minimal plate thickness.

Figure 14:
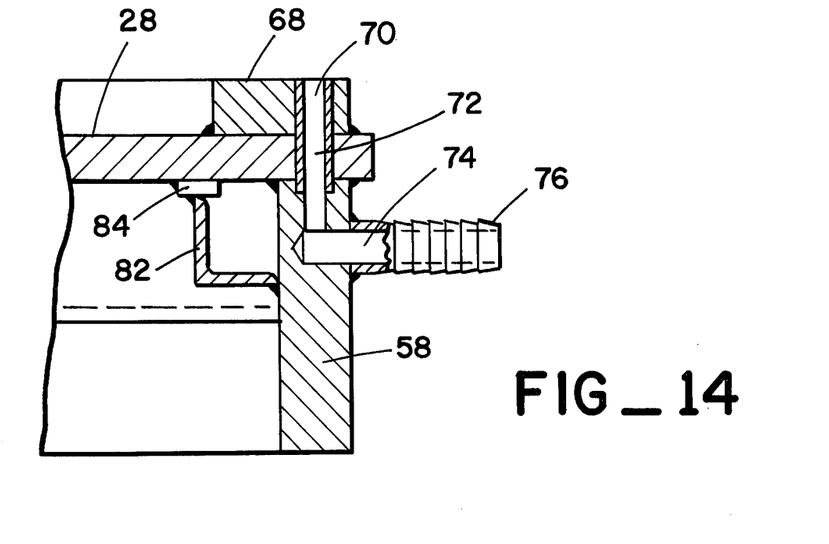
FIG. 14 is a view in section taken along line 14—14 of FIG. 8.

An upper sidewall 68 for each plate is formed by strips of material welded to the main planar member 28 and connected at their corners to form a complete rectangle. In the upper surface of these strips is a continuous groove 70 which is utilized for sealing between plates during filter operation. At one point, as shown in FIG. 14, this groove communicates with a drilled passage 72 that extends downwardly through the upper sidewall, the transverse plate and into the lower sidewall 58 where it extends outwardly through an opening 74 formed by a projecting barbed fitting 76. The latter is adapted to connect with an air suction hose or conduit which removes any liquid that may get into the groove during normal filter operation.

Figure 12:
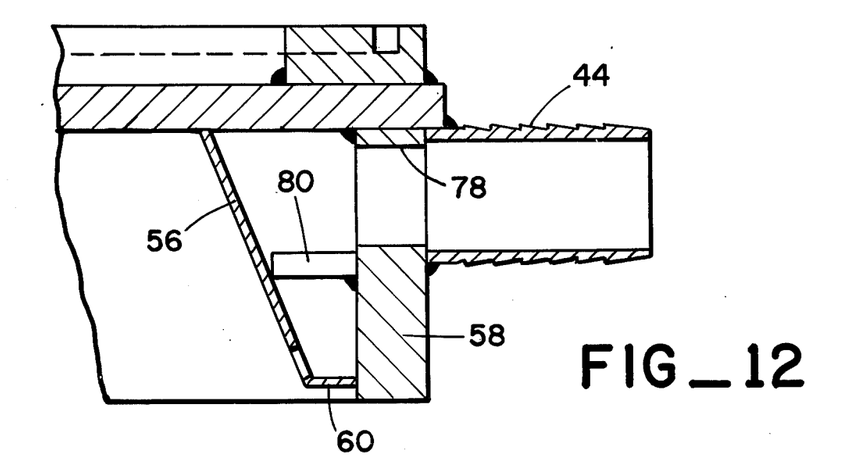
FIG. 12 is a view in section taken along line 12—12 of FIG. 8.

The lower sidewall 58 of each plate assembly 22a is also preferably fabricated from precut skirt members that are welded to the planar member 28. An inlet skirt member forming one side of the rectangular sidewall has a pair of barbed inlet fittings 44 that extend outwardly from inlet ports 78 near opposite ends of this skirt member. Spaced inwardly from the inlet skirt and welded to the plate planar member 28 along its upper edge, as shown in FIG. 12, is an inclined baffle strip 56. Located just under each inlet port 78 and extending for only a limited distance, as shown in FIG. 8, is a short strip member 80 that is welded to the skirt 58 and engages the inner surface of the baffle member 56. Attached to the inlet skirt 58 near its bottom edge is a lower horizontal strip 60 that is parallel to the short strip members 80 and forms the gap opening 62 with the bottom edge of the inclined baffle. Thus, with the aforesaid baffle arrangement, liquid to be filtered can flow through the inlet ports 44 at a relatively high rate without disturbing the filter cake. The incoming liquid striking the inclined baffle plate, expends energy and then flows laterally along the short strip members 80 before flowing downwardly and out through the gap 62 formed between the bottom edge of the inclined baffle 56 and the lower strip 60.

Figure 15:
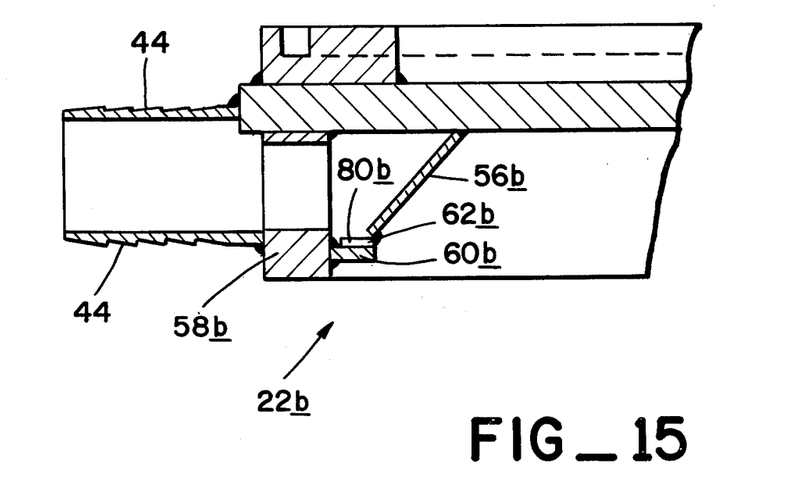
FIG. 15 is a view in section of a portion of a filter plate embodying principles of the present invention and showing a modified form of baffle arrangement.

In a somewhat modified form of the invention an intermediate plate 22b with a shorter sidewall or skirt 58b may be desirable. In this case, as shown in FIG. 15, the horizontal deflector strips 80b can be located directly adjacent the lower horizontal baffle strip 60b which is again attached to the inlet skirt near its lower edge. Again, these lower baffle strips 80b extend for only a portion of the length of the inlet skirt and therefore gap openings 62b for liquid to flow in and out of the upper chamber of the filter plate.

Figure 13:
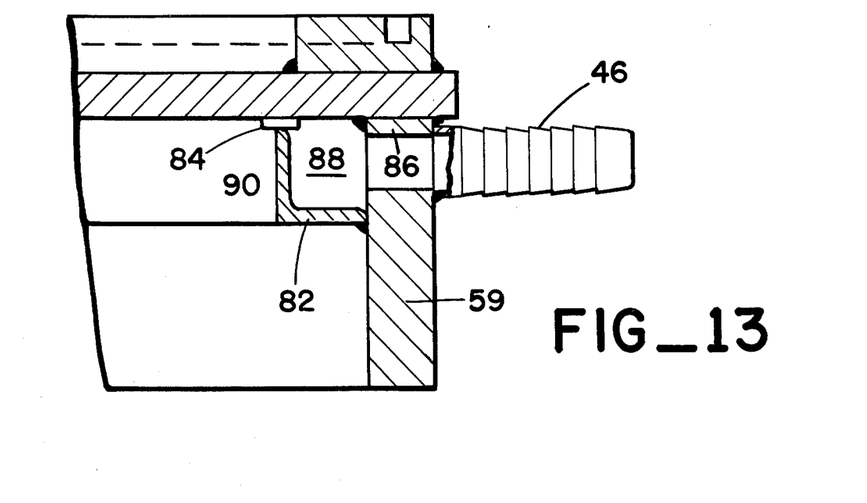
FIG. 13 is a view in section taken along line 13—13 of FIG. 8.

On the opposite side of each filter plate from the inlet skirt is an air outlet portion 59 of the lower sidewall 30 which is also preferably formed from a precut member welded to the planar member 28. Fixed to this skirt is the lower horizontal leg of a baffle member 82 having a right angle cross section. As shown in FIG. 13, the upper edge of the vertical leg of this baffle member 82 is welded to a series of longitudinally spaced apart spacer strips 84 that are themselves welded or otherwise attached to the underside of the planar member. A vent port 86 connected to a barbed vent fitting 46 is provided in the skirt 58 and this port communicates into the elongated passage 88 formed by the right angle baffle member 82 so that air can readily pass through this port and through longitudinal gaps 90 provided between the spacer strips 84.

Figure 11:
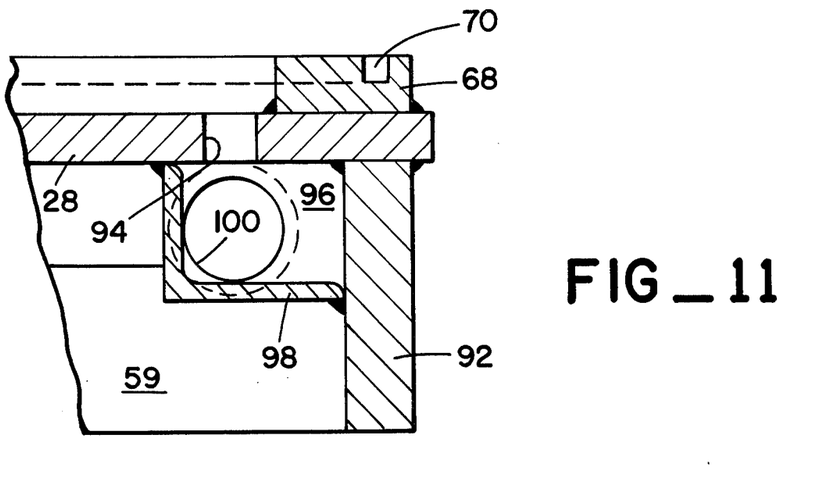
FIG. 11 is a view in section taken along line 11—11 of FIG. 8.

In each plate assembly, the inlet skirt 58 and the opposite outlet skirt 59 are both connected at their ends to side skirt members 92 to complete the rectangular sidewall. Spaced inwardly along these side skirt members, as shown in FIG. 11, are a series of spaced apart drain ports 94 in the planar member 28. Underneath these drain ports on each side of the filter plate is a collection conduit 96 formed by a right angle member 98 whose legs are welded to the skirt and the planar member, respectively. One end of each conduit forming member 98 is connected to the inlet skirt member and the other end is connected to the outlet skirt member around an outlet port 100 therein. Thus, filtered liquid collected in the lower chamber formed by each adjacent pair of plates, flows through the drain ports 94, into the collecting conduits 96 and out the outlet ports 100 provided with suitable fittings 102 for connection with conduits for carrying the liquid to a suitable storage facility (not shown).

Figure 16:
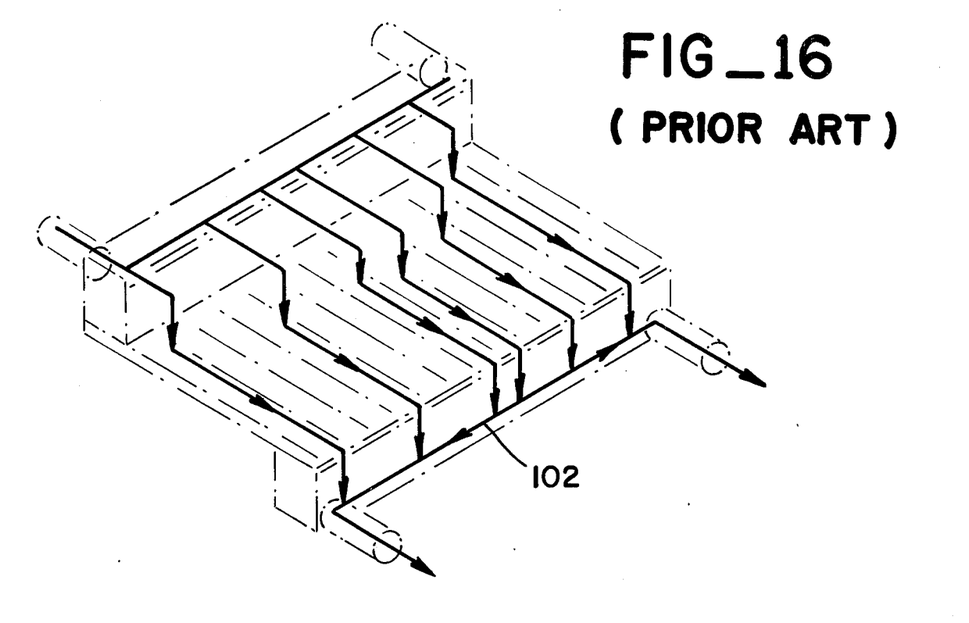
FIG. 16 is a schematic view in perspective showing by arrows the flow of fluid being filtered through a plate filter of the prior art.
Figure 17:
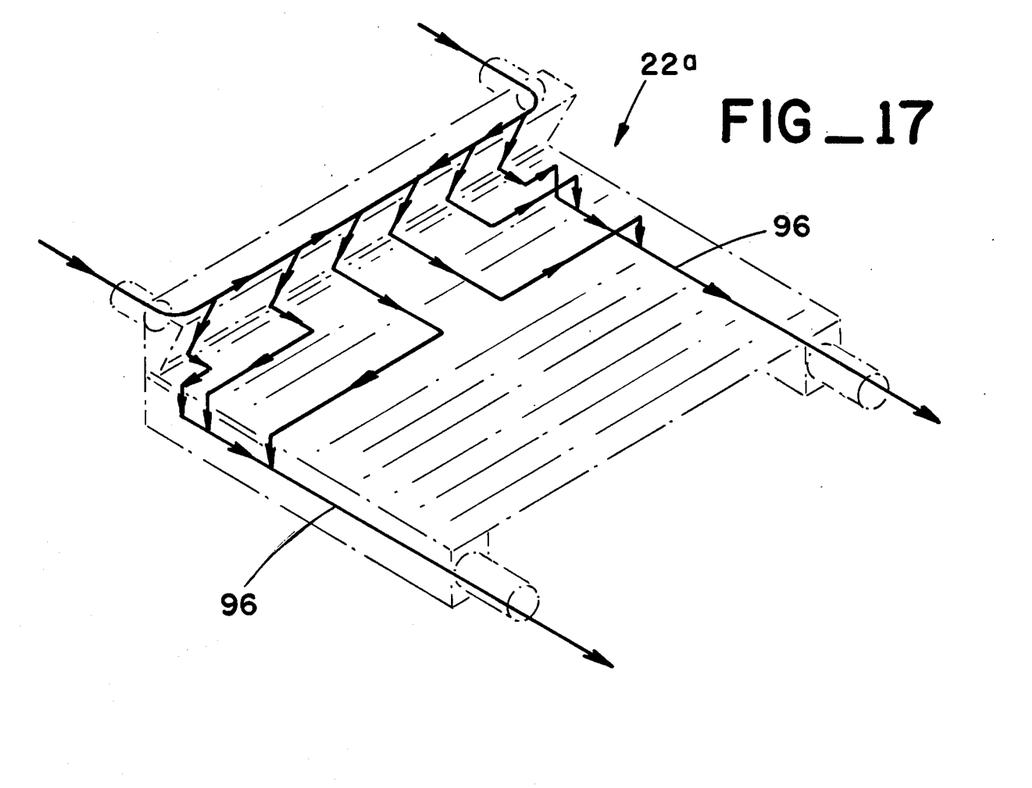
FIG. 17 is a schematic view in perspective showing by arrows the flow of fluid being filtered through a plate filter according to the present invention.

The aforesaid arrangement provides for an increased flow of filtered liquid as it passes through the filtering media in a filter according to the present invention as compared with previous horizontal plate filters. As shown schematically in FIG. 16, known prior art filters provided plate assemblies with a single collection conduit 102 along only the outlet skirt with the serrations in a support plate under the filter media extending between the inlet and outlet skirts of the plate. Thus, after passing through the filter media the filtered fluid could flow in only one direction toward the collection conduit in the prior art filters. As shown schematically in FIG. 17, the serrations of the support plate in the present filter 20a extend parallel to the inlet and outlet skirt members. Therefore, filtered liquid through the media can flow both ways on the serrated support plate to two collection conduits 96 as indicated schematically by arrows. Consequently, the filter 20a will operate more efficiently and handle a greater capacity of liquid flow through the filter media.

Figure 6:
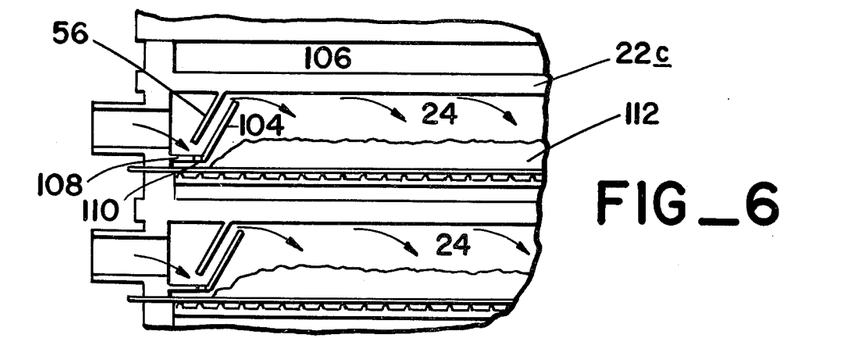
FIG. 6 is a fragmentary view in section of a modified form of plate filter according to the present invention with arrows indicating flow of fluid during the normal filtration cycle.
Figure 7:
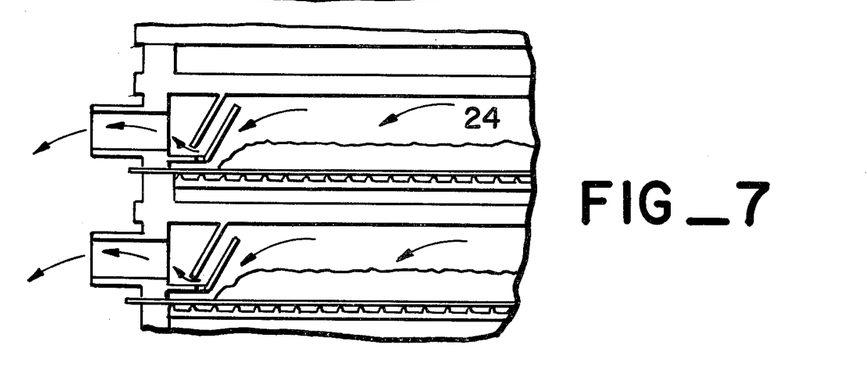
FIG. 7 is a fragmentary view in section of the filter of FIG. 6 with arrows indicating the reverse flow of liquid during the blowdown phase.

The plate assemblies 22a, as described thus far, are particularly adaptable for use with a relatively thin filter media such as a sheet of filter paper. Where other forms of filter media such as diatomaceous earth are used to build up a cake on the sheet during filter operation, a somewhat modified form of plate assembly 22a is provided according to the invention with a baffle system, as shown in FIGS. 6 and 7. Here, a first inclined baffle member 56 is attached to the underside of the planar member 28 of the plate assembly and extends along the inlet skirt 58 at a uniform distance and in front of the usual liquid inlets. A second inclined baffle member 104 is provided which is substantially parallel to the first inclined baffle member 56. The upper edge of this second baffle member is spaced downwardly from the underside of the planar member to form a gap opening 106 and its lower edge is connected to a horizontal baffle member 108 which is attached to the inlet skirt member under the inlet openings 44. Spaced apart along this lower horizontal baffle 108 is a series of relatively small holes 110.

As seen in FIG. 6, liquid being filtered enters through the plate inlet opening 44 and strikes the first inclined baffle 56. It flows under this baffle and then the major portion of it flows up and over the second baffle 104 and into the upper chamber 24 of the plate. Some of the liquid flows through the small holes 110 and by the time that the major portion of it flows over the top edge of the second baffle 104 its force has been dissipated considerably and does not disturb the filter cake 112.

During the blow-down cycle, as shown in FIG. 7, air under pressure is forced in through the vent holes of the plates as previously described and blows the liquid back out of the upper filter chamber 24 through the small holes 110 in the horizontal baffle 108, also without disturbing the filter cake. Thus, again, the blow-down procedure for a filter having the plates 22c is accomplished within a relatively short time as compared with prior filters because the baffle arrangement of the present invention allows the blow-down air to act upon and remove practically all of the liquid from the filter chamber.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. In a liquid filter comprising a plurality of separate plate assemblies, each having a central planar member with a downwardly extending peripheral skirt and an upwardly extending peripheral sidewall, said assemblies being stacked together with a layer of filter media between each pair of adjacent assemblies to form a closed upper liquid chamber on one side of the media, surrounded by a said peripheral skirt with inlets for liquid to be filtered in an inlet skirt portion and a lower chamber on the opposite side of said media surrounded by a said peripheral sidewall of another assembly and having outlets for filtered liquid in an outlet skirt portion, the improvement comprising:

a baffle means in each said plate assembly parallel to and spaced inwardly from one side of said peripheral skirt having said inlets, said baffle means including a first elongated strip extending downwardly from the planar member of the plate assembly and means forming a series of openings along the bottom edge of said first elongated strip, said openings being spaced above said filter media and thereby enabling liquid to be blown out of the upper chamber back through said inlets so that said plate assemblies can be rapidly drained of liquid before being separated to change the filter media.

2. The filter plate assembly as described in claim 1 wherein said first elongated strip forming said baffle means is inclined at an angle relative to and extends downwardly from said planar member toward said peripheral skirt having said liquid inlets.

3. The filter plate assembly as described in claim 1 wherein said openings along the bottom edge of said first elongated baffle strip are relatively long and narrow gaps located just above the lower edge of said peripheral skirt so as to be slightly above the surface of the filter media when the filter is in operation.

4. The filter plate assembly as described in claim 2 including a horizontal flow control plate located just under each said liquid inlet and extending between said peripheral skirt and said elongated inclined strip.

5. The filter plate assembly as described in claim 2 including an elongated horizontal strip spaced below the lower edge of said first inclined strip, and longitudinally spaced apart spacer members fixed to said horizontal strip and to said inclined strip to form said openings.

6. The filter plate assembly as described in claim 1 wherein said baffle means includes a second elongated strip member spaced farther away from said peripheral skirt and generally parallel to said first elongated strip extending downwardly from said planar member, said second strip member having an upper edge spaced from said planar member, and openings near its lower edge which communicate with said series of openings at the bottom edge of said first strip.

7. The filter plate assembly as described in claim 6 wherein said first and second elongated baffle strip members are both inclined at the same angle relative to said planar member and downwardly toward said inlet skirt member.

8. The filter plate assembly as described in claim 1 including the further improvement comprising a series of spaced apart drain holes on each side of said planar member, each said series extending along a line near a peripheral skirt portion and generally perpendicular to said inlet skirt portion; and a serrated filter media support plate having surface grooves which extend parallel to said inlet skirt portion, so that filtered liquid passing through the filter media can flow both ways in said grooves into said drain holes.

9. The filter plate assembly as described in claim 8 including conduit means extending between said inlet skirt and said outlet skirt located under each said series of drain holes in said planar member for receiving and conveying filtered liquid through said outlets.

* * * * *